United States Patent
McLean

(10) Patent No.: US 9,942,049 B2
(45) Date of Patent: Apr. 10, 2018

(54) REMOTE STATION AND METHOD FOR RE-ENABLING A DISABLED DEBUG CAPABILITY IN A SYSTEM-ON-A-CHIP DEVICE

(71) Applicant: QUALCOMM Incorporated, San Diego, CA (US)

(72) Inventor: Ivan Hugh McLean, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 14/245,661

(22) Filed: Apr. 4, 2014

(65) Prior Publication Data

US 2015/0288526 A1    Oct. 8, 2015

(51) Int. Cl.

| | |
|---|---|
| *H04L 29/06* | (2006.01) |
| *H04L 9/32* | (2006.01) |
| *H04L 9/30* | (2006.01) |
| *G01R 31/317* | (2006.01) |
| *G06F 21/33* | (2013.01) |

(52) U.S. Cl.
CPC ...... *H04L 9/3263* (2013.01); *G01R 31/31705* (2013.01); *G01R 31/31719* (2013.01); *G06F 21/335* (2013.01); *H04L 9/30* (2013.01); *H04L 63/0807* (2013.01)

(58) Field of Classification Search
CPC ........ G01R 31/31705; G01R 31/31719; H04L 9/30; H04L 63/0807; H04L 9/3263; G06F 21/335
See application file for complete search history.

(56) References Cited

U.S. PATENT DOCUMENTS 8,495,361 B2    7/2013   Catherman et al.
8,499,171 B2    7/2013   Mauro, II
(Continued)

FOREIGN PATENT DOCUMENTS

WO    WO-2007016395 A2    2/2007
WO    WO-2007123896 A2    11/2007

OTHER PUBLICATIONS

International Search Report and Written Opinion—PCT/US2015/023518—ISA/EPO—dated Jul. 1, 2015.

*Primary Examiner* — Tri Tran
(74) *Attorney, Agent, or Firm* — Jae-Hee Choi; Loza & Loza, LLP

(57) ABSTRACT

A disabled debug capability may be securely re-enabled in an integrated circuit such as a system-on-a-chip (SoC) device. In a method, the integrated circuit receives a debug re-enable message. The debug re-enable message includes a debug re-enable token signed by a private key. The debug re-enable token is based on a serial number of the integrated circuit and a first copy of a symmetric key. The debug re-enable token is validated using a public key corresponding to the private key. A comparison token is generated using the serial number of the integrated circuit and using a second copy of the symmetric key stored in a one-time-programmable (OTP) memory of the integrated circuit. The integrated circuit compares the debug re-enable token and the comparison token. The disabled debug capability is re-enabled in the integrated circuit if the debug re-enable token matches the comparison token.

29 Claims, 4 Drawing Sheets

(56) References Cited

U.S. PATENT DOCUMENTS

| | | | |
|---|---|---|---|
| 2007/0039054 A1* | 2/2007 | Mulla | G06F 21/73 726/26 |
| 2007/0094507 A1 | 4/2007 | Rush | |
| 2009/0164800 A1* | 6/2009 | Johansson | G06F 21/72 713/189 |
| 2009/0165111 A1* | 6/2009 | Zhang | G06F 21/335 726/9 |
| 2009/0217054 A1 | 8/2009 | Haider et al. | |
| 2010/0017840 A1 | 1/2010 | Akins, III et al. | |
| 2010/0083386 A1* | 4/2010 | Kline | G01R 31/31705 726/34 |
| 2010/0217964 A1 | 8/2010 | Peterka et al. | |
| 2011/0066835 A1 | 3/2011 | Kothari et al. | |
| 2014/0044265 A1* | 2/2014 | Kocher | H04L 9/30 380/277 |

\* cited by examiner

000# REMOTE STATION AND METHOD FOR RE-ENABLING A DISABLED DEBUG CAPABILITY IN A SYSTEM-ON-A-CHIP DEVICE

BACKGROUND

Field

The present invention relates generally to re-enabling a disabled debug capability in a system-on-a-chip (SoC) device.

Background

Debug re-enablement in a system-on-a-chip (SoC) device gives rise to security sensitivities. An original equipment manufacturer (OEM) incorporating an SoC device into its products does not want its security scheme compromised, and a manufacturer/supplier of an SoC device must be allowed to debug a device returned based on a possible manufacturing or other defect. Some OEMs may not be concerned about security and may just want things to work, without requiring an additional security effort on their part.

There is therefore a need for a technique for re-enabling a disabled debug capability in an SoC device in an effective manner.

SUMMARY

An aspect of the present invention may reside in a method for re-enabling a disabled debug capability in an integrated circuit. In the method, the integrated circuit receives a debug re-enable message. The debug re-enable message includes a debug re-enable token signed by a private key. The debug re-enable token is generated using a unique identifier of the integrated circuit and a first copy of a symmetric key. The debug re-enable token is validated using a public key corresponding to the private key. A comparison token is generated using the unique identifier and using a second copy of the symmetric key securely stored in the integrated circuit. The integrated circuit compares the debug re-enable token and the comparison token. The disabled debug capability is re-enabled in the integrated circuit if the debug re-enable token matches the comparison token.

In more detailed aspects of the invention, the integrated circuit may be a system-on-a-chip (SoC) device. The debug re-enablement message may be received from a first party, and the private key may be of the first party. The first copy of the symmetric key may be stored at a second party. The private key of the first party is not available to the second party, and the symmetric key is not available to the first party. The unique identifier may be a serial number of the integrated circuit. The comparison token may be generated based on a one-way cryptographic function using the serial number and the second copy of the symmetric key as inputs. The symmetric key may be securely stored in a one-time-programmable (OTP) memory of the integrated circuit.

Another aspect of the invention may reside in a remote station, comprising: means for receiving a debug re-enable message, wherein the message includes a debug re-enable token signed by a private key, and the debug re-enable token is based on a unique identifier of an integrated circuit and a first copy of a symmetric key; means for validating the debug re-enable token using a public key corresponding to the private key; means for generating a comparison token using the unique identifier and using a second copy of the symmetric key securely stored in the integrated circuit; means for comparing the debug re-enable token and the comparison token; and means for re-enabling a disabled debug capability in the integrated circuit if the debug re-enable token matches the comparison token.

Another aspect of the invention may reside in a remote station, comprising: a processor configured to: receive a debug re-enable message, wherein the message includes a debug re-enable token signed by a private key, and the debug re-enable token is based on a unique identifier of an integrated circuit and a first copy of a symmetric key; validate the debug re-enable token using a public key corresponding to the private key; generate a comparison token using the unique identifier and using a second copy of the symmetric key securely stored in the integrated circuit; compare the debug re-enable token and the comparison token; and re-enable a disabled debug capability in the integrated circuit if the debug re-enable token matches the comparison token.

Another aspect of the invention may reside in an integrated circuit, comprising: means for receiving a debug re-enable message from, wherein the message includes a debug re-enable token signed by a private key, and the debug re-enable token is based on a unique identifier of the integrated circuit and a first copy of a symmetric key; means for validating the debug re-enable token using a public key corresponding to the private key; means for generating a comparison token using the unique identifier and using a second copy of the symmetric key securely stored in the integrated circuit; means for comparing the debug re-enable token and the comparison token; and means for re-enabling a disabled debug capability in the integrated circuit if the debug re-enable token matches the comparison token.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 2:
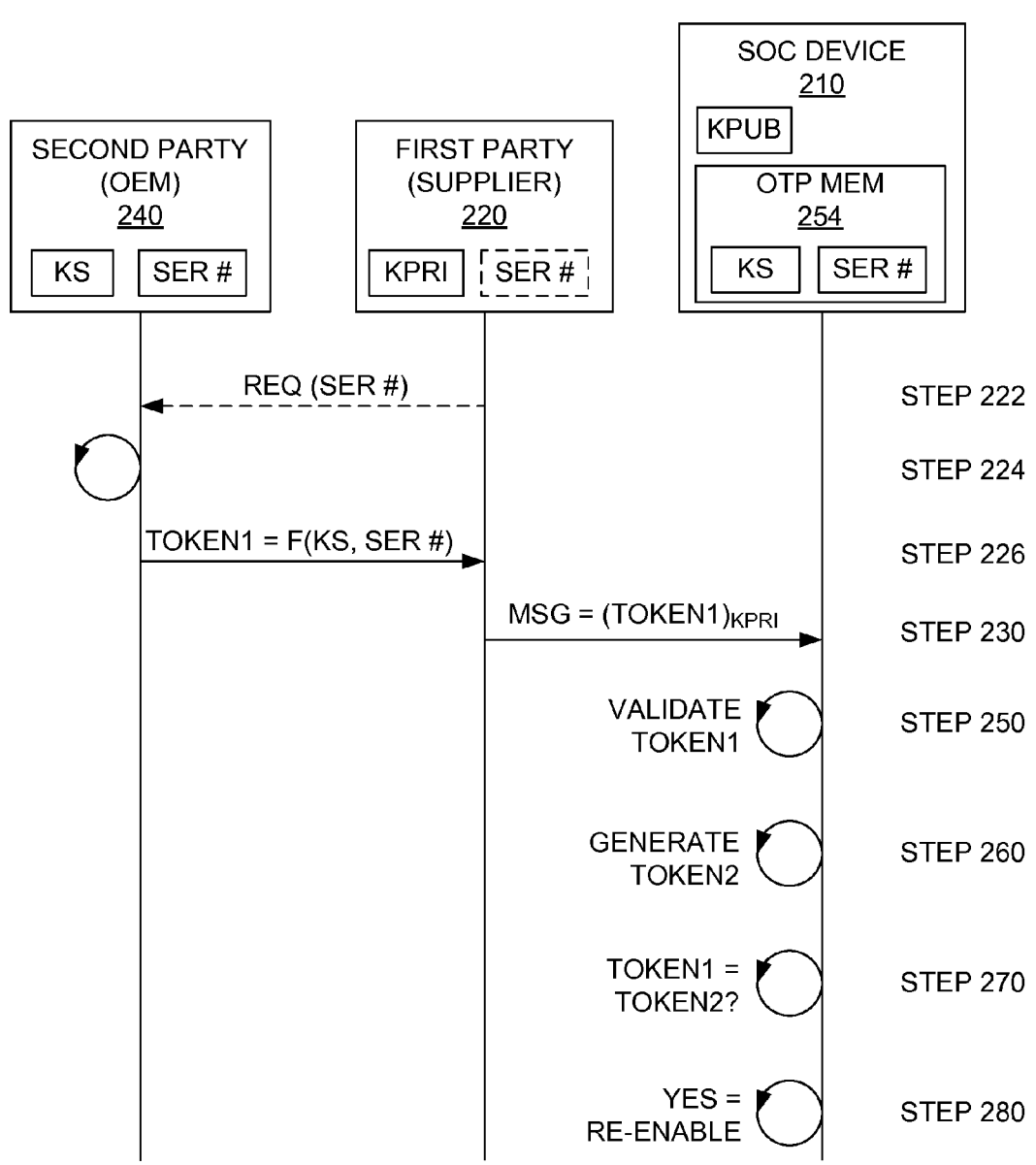
FIG. 2 is a block diagram of a method for re-enabling a disabled debug capability in an integrated circuit such as a system-on-a-chip (SoC) device, according to the present invention.
Figure 3:
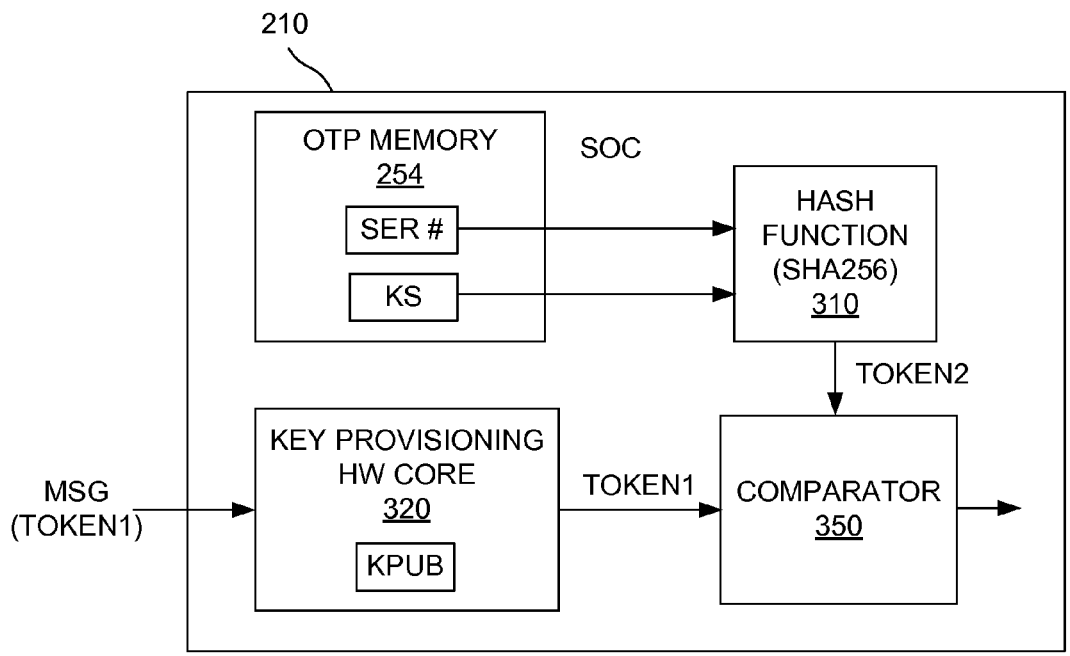
FIG. 3 is a block diagram of an SoC device.

With reference to FIGS. 2 and 3, an aspect of the present invention may reside in a method 200 for re-enabling a disabled debug capability in an integrated circuit such as a system-on-a-chip (SoC) device 210. In the method, the integrated circuit receives a debug re-enable message MSG (step 230). The debug re-enable message includes a debug re-enable token TOKEN1 signed by a private key KPRI. The debug re-enable token may be based on a unique identifier of the integrated circuit and a first copy of a symmetric key KS. The debug re-enable token is validated using a public key KPUB corresponding to the private key (step 250). A comparison token TOKEN2 is generated using the unique identifier and using a second copy of the symmetric key securely stored in the integrated circuit (step 260). The integrated circuit compares the debug re-enable token and the comparison token (step 270). The disabled debug capability is re-enabled in the integrated circuit if the debug re-enable token matches the comparison token (step 280).

In more detailed aspects of the invention, the debug re-enablement message may be received from a first party 220, and the private key may be of the first party. The first copy of the symmetric key may be stored at a second party 240. The private key KPRI of the first party is not available to the second party, and the symmetric key KS is not available to the first party. The unique identifier may be a serial number of the SoC device. The comparison token TOKEN2 may be generated based on a one-way cryptographic function, such as the SHA256 hash function 310, using the serial number and the second copy of the symmetric key as inputs. The symmetric key may be securely stored in a one-time-programmable (OTP) memory 254 of the SoC device.

In more detailed aspects of the invention, the first party 220 may be a supplier and/or a manufacturer of the SoC device 210, and the second party 240 may be an original equipment manufacturer (OEM).

The supplier (manufacturer) 220 of the SoC device 210 retains the private key KPRI for signing messages, and does not share this private key with outside parties. An OEM 240 that wants to prevent the supplier from unlocking/re-enabling a debug capability in their SoC devices may provision a symmetric (or OEM) key KS into the OTP memory (i.e., an eFuse, QFPROM, etc.) in the SoC devices. The symmetric key may be unique to each device, or may be globally shared across devices. Accordingly, the supplier may proceed as follows to re-enable debug in the SoC device 210.

The supplier 220 forwards a formal request to the OEM 240, specifying a chip serial number (step 222). This is a unique serial number stored in the OTP memory 254. Alternatively, the OEM first sends to the supplier a return material authorization (RMA) with the unique serial number.

The OEM 240 generates a per-device 256-bit debug unlock/re-enable token TOKEN1 by hashing the serial number and the OEM key KS (step 224). The OEM provides the supplier 220 with this token (step 226).

The supplier 220 generates a debug re-enable message signed by the private key KPRI which is known only to the supplier. The signed message includes the OEM-provided token TOKEN1.

A key provisioning hardware core 320 within the SoC device 210 validates the signature over the message, and unwraps and outputs the debug re-enable token TOKEN1 to a comparator 350. The SoC hardware (HW) also generates a 256-bit token TOKEN2 by performing a hash of the serial number and the OEM key KS stored in the OTP memory 254. If the received debug re-enablement token TOKEN1 matches the SoC HW generated comparison token TOKEN2, the operation (e.g., debug re-enablement) is allowed.

The technique of the invention is simple enough to implement in hardware, and allows an SoC device manufacturer to retain of ultimate RMA debug control, while at the same time allowing OEMs to block operations they don't authorize.

Figure 1:
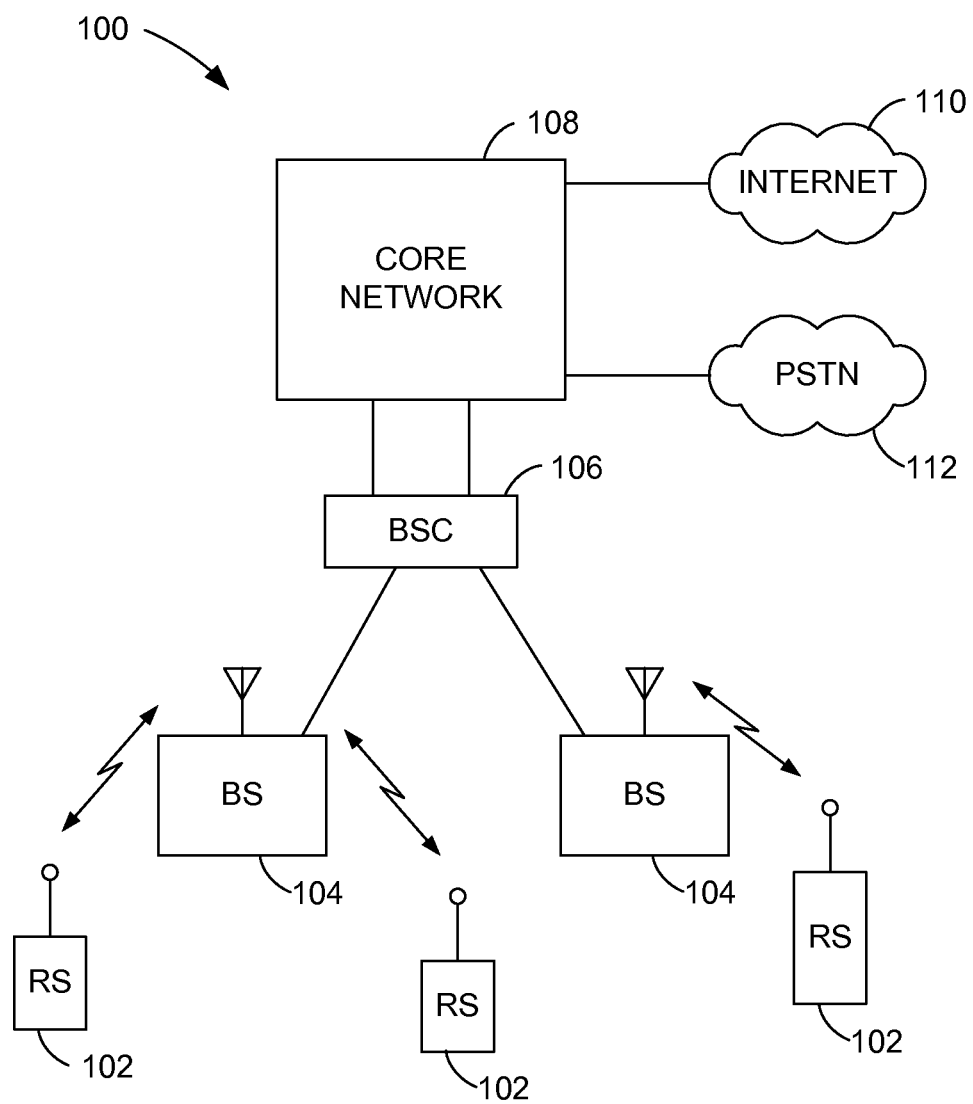
FIG. 1 is a block diagram of an example of a wireless communication system.
Figure 4:
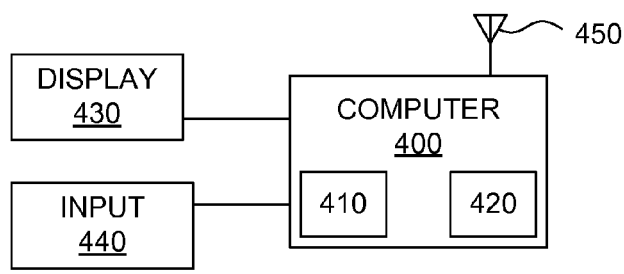
FIG. 4 is a block diagram of a computer including a processor and a memory.

With further reference to FIGS. 1 and 4, a remote station 102 may comprise a computer 400 that includes a processor 410 (such as the SoC device 210), a storage medium 420 (such as memory and/or a disk drive), a display 430, and an input such as a keypad 440, and a wireless connection 450 (such as a Wi-Fi connection and/or cellular connection).

Another aspect of the invention may reside in a remote station 102, comprising: means 410 for receiving a debug re-enable message, wherein the message includes a debug re-enable token TOKEN1 signed by a private key KPRI, and the debug re-enable token is based on a unique identifier of an integrated circuit and a first copy of a symmetric key KS; means 410 for validating the debug re-enable token using a public key KPUB corresponding to the private key; means 410 for generating a comparison token TOKEN2 using the unique identifier and using a second copy of the symmetric key securely stored in the integrated circuit; means 410 for comparing the debug re-enable token and the comparison token; and means 410 for re-enabling a disabled debug capability in the integrated circuit if the debug re-enable token matches the comparison token.

Another aspect of the invention may reside in a remote station 102, comprising: a processor 410 configured to: receive a debug re-enable message, wherein the message includes a debug re-enable token TOKEN1 signed by a private key KPRI, and the debug re-enable token is based on a unique identifier of a system-on-a-chip (SoC) device and a first copy of a symmetric key KS; validate the debug re-enable token using a public key KPUB corresponding to the private key; generate a comparison token TOKEN2 using the unique identifier and using a second copy of the symmetric key securely stored in the integrated circuit; compare the debug re-enable token and the comparison token; and re-enable a disabled debug capability in the integrated circuit if the debug re-enable token matches the comparison token.

Another aspect of the invention may reside in a integrated circuit 410, comprising: means for receiving a debug re-enable message, wherein the message includes a debug re-enable token TOKEN1 signed by a private key KPRI, and the debug re-enable token is based on a unique identifier of the integrated circuit and a first copy of a symmetric key KS; means for validating the debug re-enable token using a public key KPUB corresponding to the private key; means for generating a comparison token TOKEN2 using the unique identifier and using a second copy of the symmetric key securely stored in the integrated circuit; means for comparing the debug re-enable token and the comparison token; and means for re-enabling a disabled debug capability in the integrated circuit if the debug re-enable token matches the comparison token.

Figure 5:
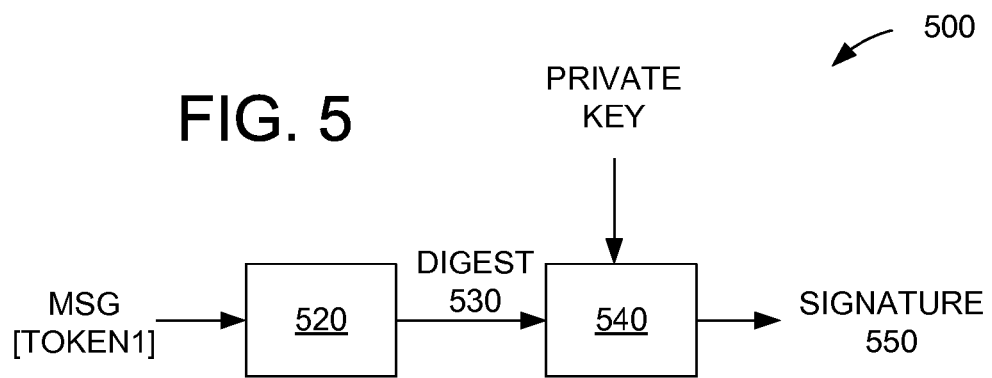
FIG. 5 is a block diagram of a method for generating a signature for a token using a private key.

A method 500 for generating the signature for the message MSG carrying the debug re-enable token TOKEN1 is shown in FIG. 5. The information in the message is input into a hash function 520, e.g., SHA2 or SHA3, to generate a digest 530. The digest is input into an algorithm 540, to generate a message signature value 550 using the private key KPRI of the first party 220.

With reference to FIG. 1, a wireless remote station (RS) 102 may communicate with one or more base stations (BS) 104 of a wireless communication system 100. The RS may be a mobile station. The wireless communication system 100 may further include one or more base station controllers (BSC) 106, and a core network 108. Core network may be connected to an Internet 110 and a Public Switched Telephone Network (PSTN) 112 via suitable backhauls. A typical wireless mobile station may include a handheld phone, or a laptop computer. The wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both non-transitory computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for re-enabling a disabled debug capability in an integrated circuit, comprising:
    receiving, by the integrated circuit, a debug re-enable message from a first party, wherein:
        the debug re-enable message includes a debug re-enable token and a signature generated, using a private key of the first party, based on the debug re-enable token included in the debug re-enable message,
        the debug re-enable token is based on a unique identifier of the integrated circuit and a first copy of a symmetric key of a second party,
        the first party is a first entity, the second party is a second entity, and the integrated circuit is a third entity,
        the first entity is separate and distinct from the second entity and from the third entity,
        the second entity is separate and distinct from the third entity, and
        the symmetric key is not available to the first party;
    validating the debug re-enable token using the signature and using a public key corresponding to the private key;
    generating a comparison token using the unique identifier, and using a second copy of the symmetric key securely stored in the integrated circuit;
    comparing, by the integrated circuit, the debug re-enable token and the comparison token; and
    re-enabling the disabled debug capability in the integrated circuit if the debug re-enable token matches the comparison token.

2. The method of claim 1, wherein the integrated circuit is a system-on-a chip (SoC) device.

3. The method of claim 1, wherein the debug re-enable message is received directly from the first party.

4. The method of claim 3, wherein the first copy of the symmetric key is stored at the second party.

5. The method of claim 1, wherein the private key of the first party is not available to the second party.

6. The method of claim 1, wherein the unique identifier is a serial number of the integrated circuit.

7. The method of claim 6, wherein the comparison token is generated based on a one-way cryptographic function using the serial number and the second copy of the symmetric key as inputs.

8. The method of claim 1, wherein the symmetric key is securely stored in a one-time-programmable (OTP) memory of the integrated circuit.

9. A remote station, comprising:
means for receiving a debug re-enable message from a first party, wherein the debug re-enable message includes a debug re-enable token and a signature generated, using a private key of the first party, based on the debug re-enable token included in the debug re-enable message, the debug re-enable token is based on a unique identifier of an integrated circuit of the remote station and a first copy of a symmetric key of a second party, the first party is a first entity, the second party is a second entity, and the integrated circuit is a third entity, the first entity is separate and distinct from the second entity and from the third entity, the second entity is separate and distinct from the third entity, and the symmetric key is not available to the first party;
means for validating the debug re-enable token using the signature and using a public key corresponding to the private key;
means for generating a comparison token using the unique identifier, and using a second copy of the symmetric key securely stored in the integrated circuit;
means for comparing the debug re-enable token and the comparison token; and
means for re-enabling a disabled debug capability in the integrated circuit if the debug re-enable token matches the comparison token.

10. The remote station of claim 9, wherein the integrated circuit is a system-on-a-chip (SoC) device.

11. The remote station of claim 9, wherein the debug re-enable message is received directly from the first party.

12. The remote station of claim 11, wherein the first copy of the symmetric key is stored at the second party.

13. The remote station of claim 9, wherein the private key of the first party is not available to the second party.

14. The remote station of claim 9, wherein the unique identifier is a serial number of the integrated circuit.

15. The remote station of claim 14, wherein the comparison token is generated based on a one-way cryptographic function using the serial number and the second copy of the symmetric key as inputs.

16. The remote station of claim 9, wherein the symmetric key is securely stored in a one-time-programmable (OTP) memory of the integrated circuit.

17. A remote station, comprising:
a processor, implemented as hardware, configured to:
receive a debug re-enable message from a first party, wherein the debug re-enable message includes a debug re-enable token and a signature generated, using a private key of the first party, based on the debug re-enable token included in the debug re-enable message, the debug re-enable token is based on a unique identifier of an integrated circuit of the remote station and a first copy of a symmetric key of a second party, the first party is a first entity, the second party is a second entity, and the integrated circuit is a third entity, the first entity is separate and distinct from the second entity and from the third entity, the second entity is separate and distinct from the third entity, and the symmetric key is not available to the first party;
validate the debug re-enable token using the signature and using a public key corresponding to the private key;
generate a comparison token using the unique identifier, and using a second copy of the symmetric key securely stored in the integrated circuit;
compare the debug re-enable token and the comparison token; and
re-enable a disabled debug capability in the integrated circuit if the debug re-enable token matches the comparison token.

18. The remote station of claim 17, wherein the debug re-enable message is received directly from the first party.

19. The remote station of claim 18, wherein the first copy of the symmetric key is stored at the second party.

20. The remote station of claim 17, wherein the private key of the first party is not available to the second party.

21. The remote station of claim 17, wherein the unique identifier is a serial number of the integrated circuit.

22. The remote station of claim 21, wherein the comparison token is generated based on a one-way cryptographic function using the serial number and the second copy of the symmetric key as inputs.

23. The remote station of claim 17, wherein the symmetric key is securely stored in a one-time-programmable (OTP) memory of the integrated circuit.

24. An integrated circuit, comprising:
means for receiving a debug re-enable message from a first party, wherein the debug re-enable message includes a debug re-enable token and a signature generated, using a private key of the first party, based on the debug re-enable token included in the debug re-enable message, the debug re-enable token is based on a unique identifier of the integrated circuit and a first copy of a symmetric key of a second party, the first party is a first entity, the second party is a second entity, and the integrated circuit is a third entity, the first entity is separate and distinct from the second entity and from the third entity, the second entity is separate and distinct from the third entity, and the symmetric key is not available to the first party;
means for validating the debug re-enable token using the signature and using a public key corresponding to the private key;
means for generating a comparison token using the unique identifier, and using a second copy of the symmetric key securely stored in the integrated circuit;
means for comparing the debug re-enable token and the comparison token; and
means for re-enabling a disabled debug capability in the integrated circuit if the debug re-enable token matches the comparison token.

25. The integrated circuit of claim 24, wherein the integrated circuit is a system-on-a-chip (SoC) device.

26. The integrated circuit of claim 24, wherein the debug re-enable message is received directly from the first party, and the first copy of the symmetric key is stored at the second party.

27. The integrated circuit of claim 24, wherein the unique identifier is a serial number of the integrated circuit.

28. The integrated circuit of claim 27, wherein the comparison token is generated based on a one-way cryptographic function using the serial number and the second copy of the symmetric key as inputs.

29. The integrated circuit of claim 24, wherein the symmetric key is securely stored in a one-time-programmable (OTP) memory of the integrated circuit.

* * * * *